(12) United States Patent
Varone et al.

(10) Patent No.: US 6,752,854 B1
(45) Date of Patent: Jun. 22, 2004

(54) VENTURI SCRUBBER PLATE, WASTE CAPTURE SYSTEM, AND METHOD

(75) Inventors: Russell Varone, Red Lion, PA (US); Michael Shane Deitz, Manchester, PA (US)

(73) Assignee: Graham Packaging Company, L.P., York, PA (US)

( * ) Notice: Subject to any disclaimer, the term of this patent is extended or adjusted under 35 U.S.C. 154(b) by 17 days.

(21) Appl. No.: 10/319,555

(22) Filed: Dec. 16, 2002

(51) Int. Cl.$^7$ ............................................. B01D 47/10
(52) U.S. Cl. .................. 95/216; 55/DIG. 46; 96/275; 96/323; 118/326; 261/DIG. 54
(58) Field of Search .................. 95/216, 217; 96/275, 96/323, 324, 325, 326, 327, 328; 55/DIG. 54, 46; 261/DIG. 54; 118/326, 603

(56) References Cited

U.S. PATENT DOCUMENTS

| | | | | |
|---|---|---|---|---|
| 2,259,626 A | * | 10/1941 | Erikson | 454/55 |
| 2,337,983 A | * | 12/1943 | Fisher | 261/3 |
| 2,385,077 A | * | 9/1945 | Harker | 261/118 |
| 2,395,960 A | * | 3/1946 | Clark | 96/358 |
| 2,527,139 A | * | 10/1950 | Loney | 454/55 |
| 2,536,998 A | * | 1/1951 | Newcomb et al. | 96/265 |
| 2,873,816 A | * | 2/1959 | Umbricht et al. | 96/265 |
| 3,018,847 A | * | 1/1962 | Stanly | 96/324 |
| 3,421,293 A | * | 1/1969 | Halls | 96/276 |
| 3,803,997 A | * | 4/1974 | Van Raden | 454/54 |
| 4,220,078 A | * | 9/1980 | Walker et al. | 454/54 |
| 4,283,999 A | * | 8/1981 | Kearney | 454/54 |
| 4,295,866 A | * | 10/1981 | Kearny | 96/238 |
| 4,345,921 A | * | 8/1982 | Gustavsson et al. | 96/272 |
| 4,350,506 A | * | 9/1982 | Otto | 96/323 |
| 4,440,554 A | * | 4/1984 | Perry | 96/323 |
| 4,475,447 A | * | 10/1984 | Kock et al. | 454/54 |
| 4,484,513 A | * | 11/1984 | Napadow | 454/55 |
| 4,601,236 A | * | 7/1986 | Napadow | 454/54 |
| 4,608,064 A | * | 8/1986 | Napadow | 96/307 |
| 4,612,025 A | * | 9/1986 | Sampey | 96/276 |
| 4,700,615 A | | 10/1987 | Napadow | |
| 4,704,952 A | * | 11/1987 | Johnson et al. | 454/54 |
| 4,721,033 A | * | 1/1988 | Bloomer et al. | 454/52 |
| 4,732,589 A | * | 3/1988 | Parslow, Jr. | 96/328 |
| 4,946,718 A | | 8/1990 | Napadow | |
| 5,020,470 A | * | 6/1991 | West et al. | 118/326 |
| 6,666,166 B2 | * | 12/2003 | Kramer et al. | 118/326 |

* cited by examiner

Primary Examiner—Duane S. Smith
(74) Attorney, Agent, or Firm—Venable LLP; James R. Burdett; Keith G. Haddaway

(57) ABSTRACT

A venturi scrubber plate for a waste capture system and method for a waste material entrained in a fluid flow includes an enclosure having a flood sheet over which a liquid flows into a collection trough, an exhaust device which draws the fluid flow from the enclosure, across the collection trough, and through a throat section to a primary scrubber section, the venturi scrubber plate including a plate which is mounted on and substantially covers the collection trough, which has defined therein a plurality of holes, and through which the fluid flow containing the waste material flows, wherein the plate imposes a venturi effect on the fluid flow effective to accelerate the fluid flow so that turbulent mixing of the fluid flow containing the waste material and the liquid takes place and results in improved capture of waste material by the liquid ahead of the primary scrubber section.

26 Claims, 4 Drawing Sheets

VENTURI SCRUBBER PLATE, WASTE CAPTURE SYSTEM, AND METHOD

BACKGROUND OF THE INVENTION

1. Field of the Invention

This invention relates to a new and useful invention concerning fluid curtain scrubbing of gas borne waste material, a scrubber device, and a method for capture of the gas borne waste materials. The waste material may be a liquid waste entrained in a gas, such as paint entrained in air after spraying the paint onto an article in a spray booth, a particulate waste entrained in a gas, such as dust contained in flue gas, and/or a gaseous waste, such as $NO_x$ or $SO_x$ contained in flue gas, by way of example but not limitation. The fluid curtain may be a gas such as air or a liquid such as water or a solvent.

More particularly, the invention relates to a venturi scrubber plate and a waste capture system and method employing the venturi scrubber plate. In one embodiment useful as a waste paint capture system for a paint spraying booth, water flows down a flood sheet positioned downstream of paint spray heads and entrains paint overspray to minimize buildup of paint on the interior of the booth. The water from the flood sheet flows into a trough which additionally receives water from a primary scrubber section. An exhaust fan draws air from the spray booth through the trough and through a throat section leading to the primary scrubber section where a flow of water knocks down remaining waste materials from the air flow before it is exhausted through the exhaust fan. Waste paint capture is improved by positioning a perforated plate over the trough so that the waste paint laden air from the spray booth is sucked through the perforated plate with an advantageous venturi scrubbing effect.

The novel venturi scrubber plate is configured to effectively control air velocity through the plate, preferably in a range of from about 1000 to about 2000 linear feet per minute. This advantageously results in a high turbulence profile for the flow akin to misting or atomization which improves paint capture by up to a factor of three times. Contact with paint detacification chemicals contained in the water is advantageously improved so that paint particle formation is inhibited and dectacification efficiency increased.

2. Description of the Prior Art

Scrubbers are know and work on the general principle of employing a fluid curtain to entrain gases, droplets and/or particles. Passing a stream of airborne material through a water curtain, for example, serves to at least entrain and possibly dissolve (a) gases, such as $NO_x$ and $SO_x$ contained in flue gases, (b) droplets, such as waste paint from a spray operation or any entrained liquid in droplet form, and/or (c) particles, such as fly ash contained in flue gas or powder from an electrostatic coating operation such as paint, sugar, salt, or other such commodities.

The scrubber curtain is typically a water curtain, but may be almost any fluid including liquids, such as solvents, for example, alcohols having 1–8 carbon atoms, and gases, such as a curtain of air or inert gas,flowing at a rate chosen to be effective to knock down material to be removed.

Fluid curtains are known in the art as described in, for example, U.S. Pat. Nos. 4,700,615 and 4,946,718 to Stanley Napadow, the disclosures of which are herein incorporated by reference.

U.S. Pat. No. 4,946,718 describes an air curtain protection system for article conveyors of product treatment booths including a paint spraying booth, washer or filter air cleaning system, and baking oven. Product support members extend through a slot provided in a conveyor mechanism housing into the product treatment booth. A blower forces ambient air through a supply nozzle formed by a plenum on one side of the slot and draws air through a suction nozzle formed by a second plenum on the opposite side of the slot to form a high velocity stream or curtain of air across the slot. This reduces the ingress of deleterious heat or atmosphere from the product treatment booth into the conveyor mechanism housing so that a measure of protect is afforded the conveyor and heat is conserved.

A spray booth including both air and water curtains is described in U.S. Pat. No. 4,700,615. Air flows from a plenum provided under a roof assembly of the booth down to the floor and through side plenums and a throat to wash the interior side walls as an air curtain to prevent adherence of paint particles on the side walls. Water curtains are provided within an air cleaning apparatus positioned under the booth floor through which the down flowing air from the spray booth is pulled by a blower. The flowing air is directed through a series of water curtains to an outlet slot where the air velocity is increased and then slowed down in a larger volume separation chamber where water and air are separated. The direction of air and water flow are reversed several times as the air flows serially through the water curtains the concept being to obtain turbulent air/water mixing so that the particles are wetted and brought down by their increased weight. The water and air are discharged into a large precipitation chamber in which the water is collected and the air velocity is reduced substantially before discharge through an air exhaust duct.

An additional waste paint capturing system 10 currently used in an industrial, high volume spray booth is schematically illustrated in cross-section in FIG. 1 (Prior Art). Articles 1 are transported by a conveyor means 5 through spray booth 10. Spray heads 15 direct paint 20 onto the articles 1. An exhaust means 25 removes air 30 and paint overspray 35 from the booth as an air flow 40 to a primary scrubber section 45 which includes a clean water supply means 46 and a water curtain 48. Within the booth 10, water 50 flows from a clean water supply means 55 down a flood sheet 60 positioned downstream of paint spray heads 15 and entrains paint overspray 35 to minimize buildup of paint on the interior of booth 10. The water 50 from the flood sheet 60 flows as a water curtain 65 into a trough 70 which additionally receives water 48 from the primary scrubber section 45. The exhaust means 25 draws the air flow 40 from the spray booth 10 across the trough 70, through the water curtain 65 and through a throat section 75 leading to the primary scrubber section 45 where the flow of water 48 wets and knocks down remaining waste paint 35 from the air flow 40 before it is exhausted through exhaust means 25. The industry standard air velocity across the throat section 75 of the primary scrubber section 45 for effective water wash scrubbing of paint overspray ranges from 1500 to 1750 linear feet per minute. A flow of scrubbed air 80 exits the paint capturing system 10 through the exhaust means 25.

The effectiveness of such conventional waste capture systems including scrubbers to entrain and remove waste gases, droplets and/or particles leaves much to be desired, however. The costs of downtime and filters required for general maintenance and cleaning of waste capture systems remains excessive, particularly waste paint capture systems where accumulations on booth surfaces is a substantial problem.

Accordingly, it is an object of the present invention to provide a waste material capture system and method having a higher efficiency of waste material capture whether solid, e.g., flue dust or particulates from a powder or electrostatic spray operation such a commodities, for example, sugar and salt, liquid, e.g., paint or other sprayable compositions, or gaseous, e.g., noxious gasses such as $NO_x$ and/or $SO_x$, than that previously known in the prior art.

It is another object of the present invention to provide a waste material capture system and method which permits significantly reduced downtime for cleaning of surfaces, changing of filters, and general maintenance, and thereby significantly reduces operational costs.

It is yet another object of the present invention to provide a waste paint capture system which permits significantly reduced downtime for cleaning of spray booth surfaces, changing of filters, and general maintenance, and thereby significantly reduces operational costs attendant to paint spray booth operation, especially an industrial, large scale, paint spray booth operation.

SUMMARY OF THE INVENTION

These and other objects are accomplished by the present invention by providing a venturi scrubber plate for a waste capture system for a waste material entrained in a fluid flow, which waste capture system includes an enclosure having a flood sheet over which a liquid flows into a collection trough, an exhaust means which draws the fluid flow containing the waste material from the enclosure, across the collection trough, and through a throat section to a primary scrubber section, the venturi scrubber plate comprising: a plate which is mounted on and substantially covers the collection trough, which has defined therein a plurality of holes, and through which the fluid flow containing the waste material flows, wherein the plate imposes a venturi effect on the fluid flow effective to accelerate the fluid flow so that turbulent mixing of the fluid flow containing the waste material and the liquid takes place and results in improved capture of waste material by the liquid ahead of the primary scrubber section.

The venturi scrubber plate may additionally comprising a plurality of collection tubes extending downwardly from respective ones of the plurality of holes toward the liquid flowing in the collection trough. The plurality of collection tubes may have respective heights which are graduated to maintain an approximately constant spacing between the liquid flowing in the collection trough and the collection tubes. The plurality of holes in the plate may be spaced apart in a regularly array or in a staggered array. The plurality of holes have a diameter and are present in a number effective to accelerate the fluid flow and provide a flow velocity ranging from about 1000 to about 2000 linear feet per minute across the throat section of the primary scrubber section, preferably from about 1500 to about 2000 linear feet per minute, most preferably from about 1500 to about 1750 linear feet per minute.

The waste material may be at least one material selected from the group consisting of a gas, a liquid, and a solid. The gas may be at least one noxious gas such as flue gas, $NO_x$ and/or $SO_x$. The liquid may be paint or any other sprayable composition. The solid may be one of flue dust or commodities to be powder coated such as sugar and salt.

The fluid may be a gas such as air or an inert gas. The liquid may be a solvent such as water and/or an alcohol having from 1 to 8 carbon atoms.

These and other objects are accomplished by the present invention by providing a waste capture system for a waste material entrained in a fluid flow, comprising a venturi scrubber plate as described above.

These and other objects are accomplished by the present invention by providing, in a spraying apparatus comprised of an enclosure having a flood sheet over which a liquid flows into a collection trough, an exhaust means which draws a fluid flow containing waste material from the enclosure, across the collection trough, and through a throat section to a primary scrubber section, the improvement comprising: a venturi scrubber plate as described above mounted on and substantially covering the collection trough.

These and other objects are accomplished by the present invention by providing a method for capture of waste material entrained in a fluid flow, comprising the steps of: providing an enclosure having a flood sheet over which a liquid flows into a collection trough; providing an exhaust means which draws the fluid flow containing the waste material through the enclosure, across the collection trough, and through a throat section to a primary scrubber section; and mounting a venturi scrubber plate according to claim 1 to substantially cover the collection trough, wherein the venturi scrubber plate imposes a venturi effect on the fluid flow effective to accelerate the fluid flow so that turbulent mixing of the fluid flow containing the waste material and the liquid takes place and results in improved capture of waste material by the liquid ahead of the primary scrubber section.

These and other objects are accomplished by the present invention by providing a venturi scrubber plate for a waste paint capture system for a waste paint entrained in an air flow, which waste paint capture system includes an spray booth enclosure having a flood sheet over which water flows into a collection trough, an exhaust means which draws the air flow containing the waste paint from the spray booth enclosure, across the collection trough, and through a throat section to a primary scrubber section, the venturi scrubber plate comprising: a plate which is mounted on and substantially covers the collection trough, which has defined therein a plurality of holes, and through which the air flow containing the waste paint flows, wherein the plate imposes a venturi effect on the air flow effective to accelerate the air flow so that turbulent mixing of the air flow containing the waste paint and the water takes place and results in improved capture of waste paint by the water ahead of the primary scrubber section.

The venturi scrubber plate may additionally comprise a plurality of collection tubes extending downwardly from respective ones of the plurality of holes toward the water flowing in the collection trough. The plurality of collection tubes may have respective heights which are graduated to maintain an approximately constant spacing between the water flowing in the collection trough and the collection tubes. The plurality of holes in the plate may be spaced apart in a regular array or in a staggered array. The plurality of holes may have a diameter and be present in a number effective to accelerate the air flow and provide a flow velocity ranging from about 1000 to about 2000 linear feet per minute, preferably from about 1500 to about 2000 linear feet per minute, more preferably from about 1500 to about 1750 linear feet per minute, across the throat section of the primary scrubber section.

These and other objects are accomplished by the present invention by providing a waste paint capture system for waste paint entrained in an air flow, comprising a venturi scrubber plate as described above.

These and other objects are accomplished by the present invention by, in a spraying apparatus comprised of an spray booth enclosure having a flood sheet over which water flows into a collection trough, an exhaust means which draws an air flow containing waste paint from the enclosure, across the collection trough, and through a throat section to a primary scrubber section, the improvement comprising: a venturi scrubber plate as described above mounted on and substantially covering the collection trough.

These and other objects are accomplished by the present invention by providing a method for capture of waste paint entrained in an air flow, comprising the steps of providing an enclosure having a flood sheet over which water flows into a collection trough; providing an exhaust means which draws the air flow containing the waste material through the enclosure, across the collection trough, and through a throat section to a primary scrubber section; and mounting a venturi scrubber plate as described above to substantially cover the collection trough, wherein the venturi scrubber plate imposes a venturi effect on the air flow effective to accelerate the air flow so that turbulent mixing of the air flow containing the waste paint and the water takes place and results in improved capture of waste paint by the water ahead of the primary scrubber section.

The method may further comprise including at least one additive in the water selected from the group consisting of a surfactant, an anti-foaming agent, and a detacifier. The method may further comprise including an additive in the water which is a detacifier effective to bind with reactive end groups of polymeric constituents of the paint, such as a formaldehyde amine.

BRIEF DESCRIPTION OF THE DRAWING

The invention is better understood with reference to the drawings in which.

DESCRIPTION OF THE PREFERRED EMBODIMENTS

Figure 1:
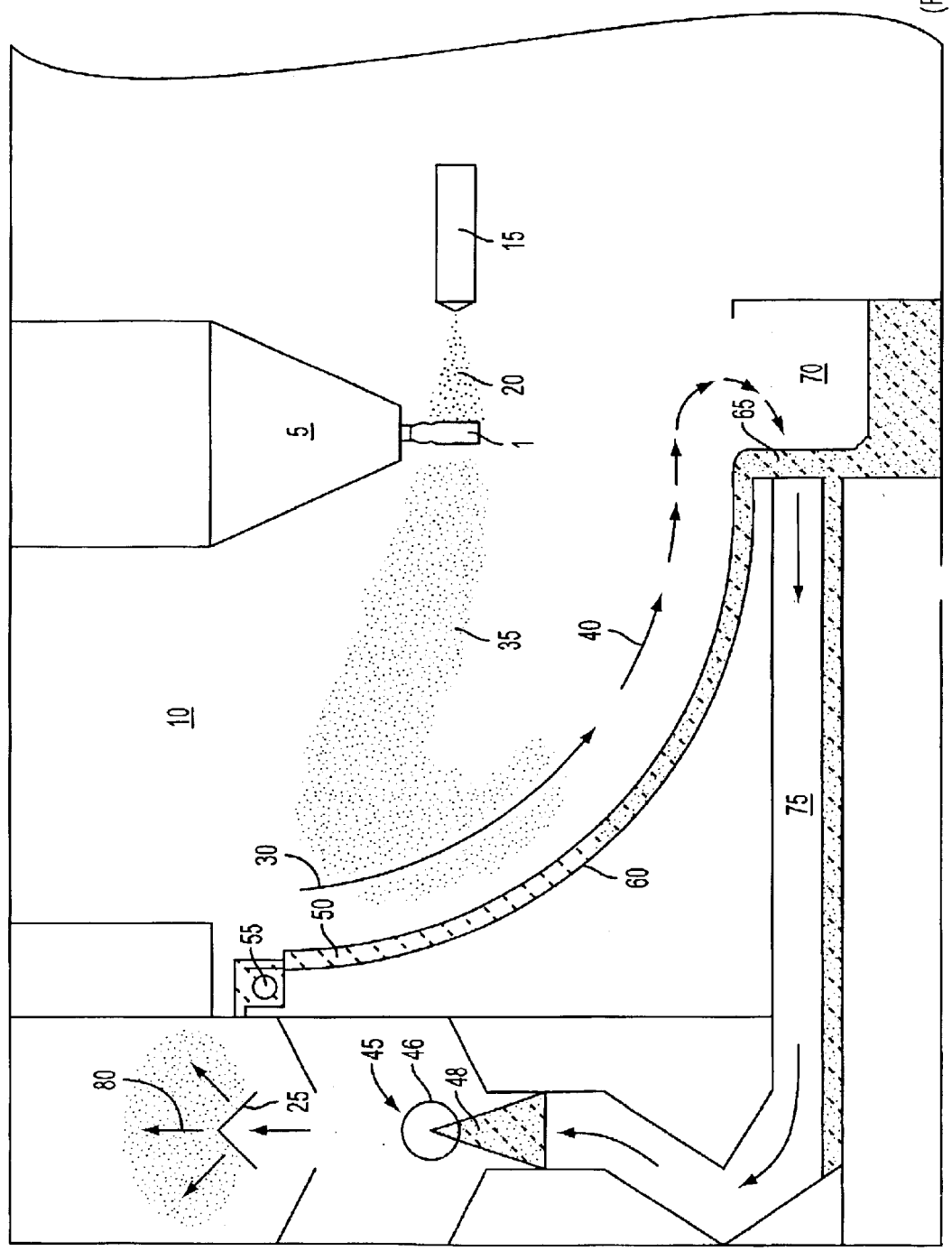
FIG. 1 is a schematic cross-sectional view of a prior art waste paint capture system featuring a flood sheet, water curtain, and trough.
Figure 2:
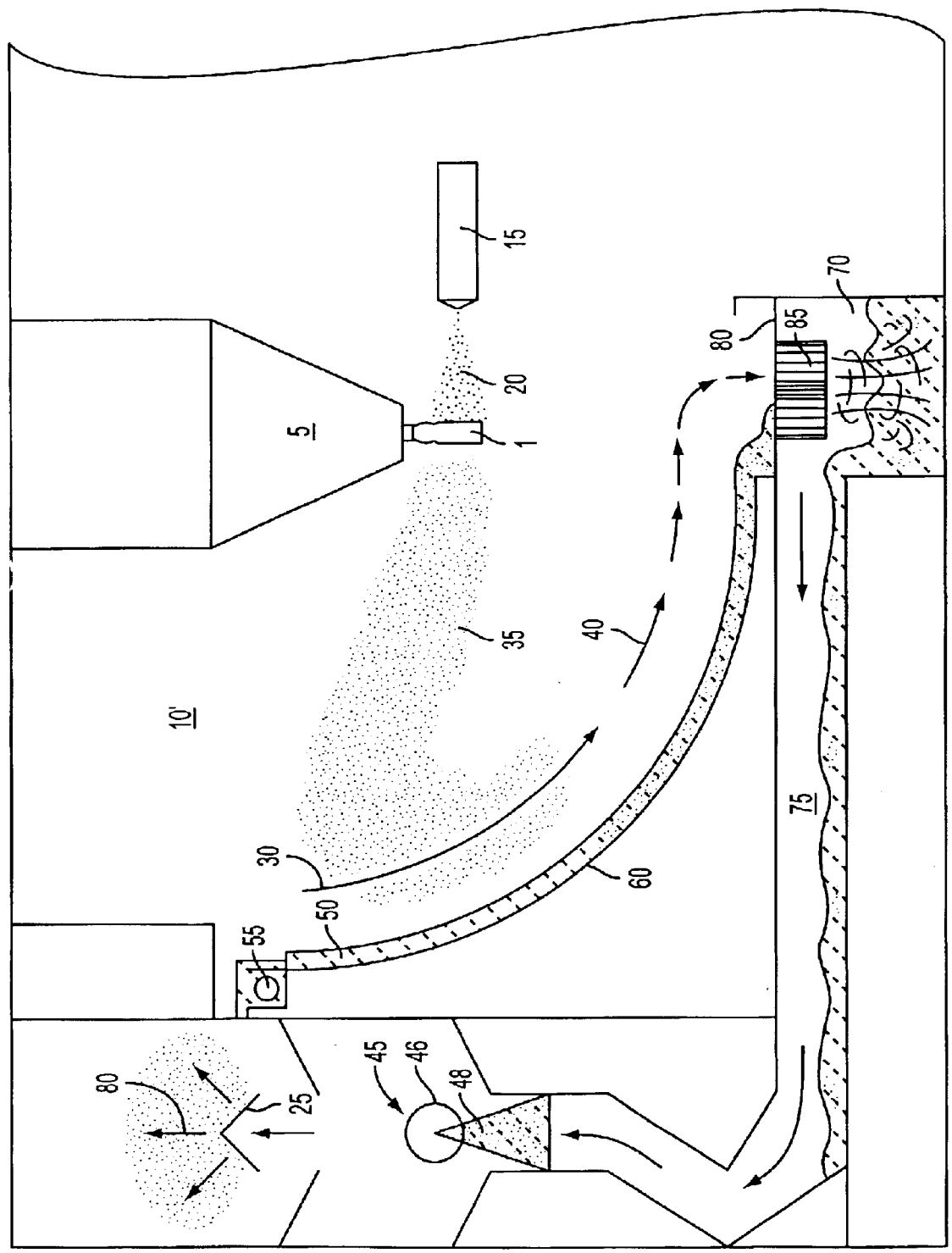
FIG. 2 is a schematic cross-sectional view of a waste paint capture system which includes a venturi scrubber plate according to the present invention.

FIG. 2 is a schematic cross-sectional view of a waste paint capture system 10' according to the invention for use in an industrial, high volume paint spray booth. Similar to the spray booth 10 shown in prior art FIG. 1, articles 1 are transported by a conveyor means 5 through an inventive spray booth 10'. Spray heads 15 direct paint 20 onto the articles 1. An exhaust means 25 removes air 30 and paint overspray 35 from the booth as an air flow 40 to a primary scrubber section 45 which includes a clean water supply means 46 and a water curtain 48. Within the booth 10', water 50 flows from a clean water supply means 55 with a reservoir down a flood sheet 60 positioned downstream of paint spray heads 15 and entrains paint overspray 35 to minimize buildup of paint on the interior of booth 10'. The water 50 from the flood sheet 60 flows into a trough 70 which additionally recesses water 48 from the primary scrubber section 45.

Unlike prior art FIG. 1, however, no water curtain section 65 is featured. Rather, a venturi scrubber plate 80 according to the present invention is mounted on and substantially covers the open end of the collection trough 70. Plate 80 is provided with a plurality of through holes through which flows water 50 and the air flow containing the waste paint 40. The plate 80 imposes a venturi effect on the air flow 40 effective to accelerate the air flow 40 so that turbulent mixing of the air flow 40 containing the waste paint 35 and the water 50 takes place, surface tension is overcome, and improved capture of waste paint 35 by water 50 is obtained ahead of the primary scrubber section 45. This further reduces waste paint build up in the waste paint capture system 10'. The turbulence obtained is akin to a misting or atomizing operation.

The exhaust means 25 draws the air flow 40 from the spray booth 10' across the trough 70 and through a throat section 75 leading to the primary scrubber section 45 where the flow of water 48 wets and knocks down remaining waste paint 35 from the air flow 40 before it is exhausted through exhaust means 25. A flow of scrubbed air 80 exits the paint capturing system 10' through the exhaust means 25.

The venturi scrubber plate 80 of this working embodiment is additionally provided with collection tubes 85 extending downwardly from each of the plurality of holes 82. These collection tubes 85 direct the flow 40 of waste paint ladden air into the moving water stream 50 into the collection trough 70. The industry standard air velocity across the throat section 75 of the primary scrubber section 45 for effective water wash scrubbing of paint overspray ranges from 1500 to 1750 linear feet per minute. The collection tubes 85 function to increase the air velocity across the plate to a much greater extent than possible from a plate 80 with holes 82 alone because of an increased venturi effect. This provides greater mixing, energy to overcome surface tension and promote better wetting, and reduced particle formation and agglomeration.

Figure 3:
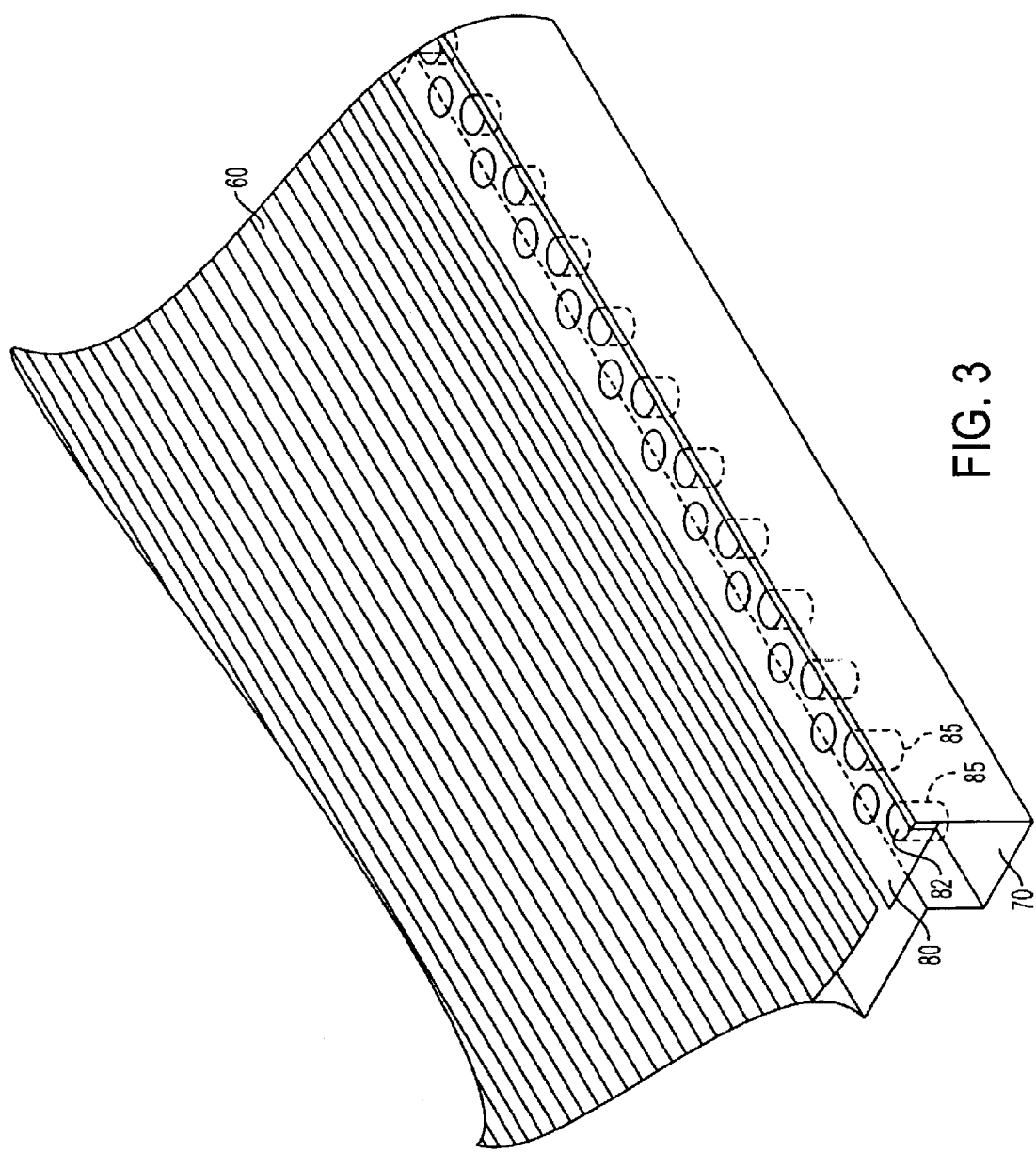
FIG. 3 is an isometric view of a water curtain system showing an arcuate flow sheet over which water (not shown) flows in use through a venturi scrubber plate according to the invention into a water collection trough.

FIG. 3 is an isometric view of a water curtain system 10' showing an arcuate flood sheet 60 over which water 50 (not shown in FIG. 3) flows in use through a venturi scrubber plate 80 according to the invention into a water collection trough 70. Shown is an embodiment in which the bottom of trough 70 is inclined and the collection tubes 85 have heights, h, which vary in a graduated manner (one row shown in phantom) to maintain an even distribution of air flow over the top of the pitched body of water flowing in the collection trough 70 (see also FIG. 5).

Figure 4:
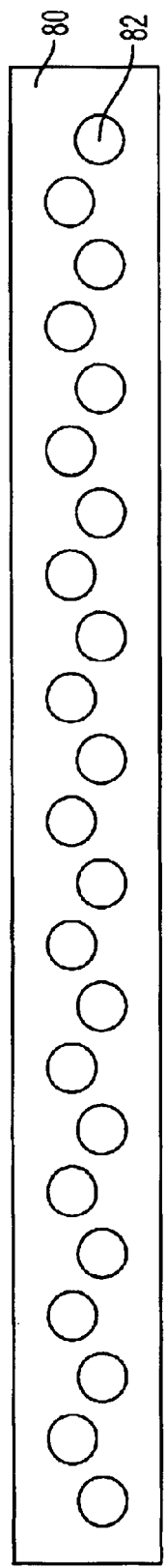
FIG. 4 is a top plan view of the venturi scrubber plate showing a staggered hole arrangement.

FIG. 4 is a top plan view of the venturi scrubber plate 80 showing a spaced out and staggered hole array for holes 82. This contributes to uniformity of flow but other arrays are effective as well.

Figure 5:
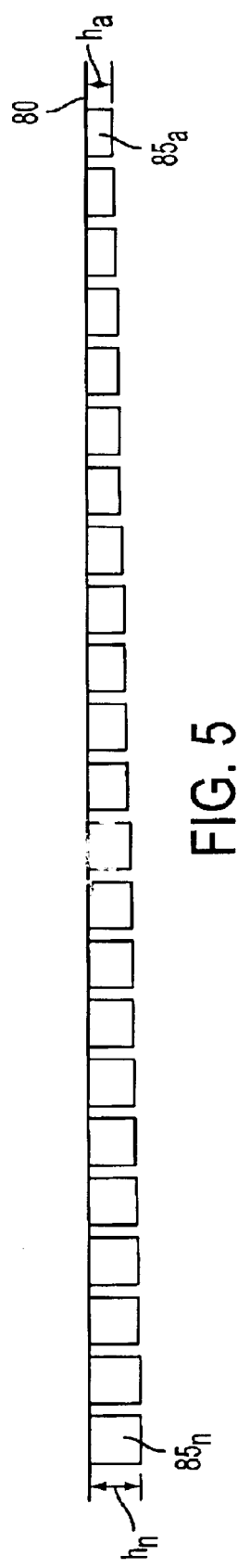
FIG. 5 is a side elevational view of the venturi scrubbing plate of FIG. 4 showing collection tubes which direct the flow of air and water into an inclined trough, and illustrating one embodiment where the collection tubes have a graduated length in order to maintain a generally uniform distance between the ends of the tubes and the water level in the trough thereby compensating for a lesser water level at the upper end of the inclined trough compared to that at the lower end.

FIG. 5 is a side elevational view of the venturi scrubbing plate 80 of FIG. 4 showing collection tubes 85 extending downwardly from plate 80 toward the water 48,50 in the trough 70. Collection tubes 85 direct the flow of air 40 and water 50 into a collection trough 70 which is inclined. FIG. 5 schematically illustrates one embodiment where the collection tubes 85a through 85n have heights, $h_a$ through $h_n$, respectively, which are graduated in order to maintain a generally uniform distance between the ends of the tubes 85 and the water level in the trough 70 thereby compensating for a lesser water level at the upper end of the inclined trough 70 compared to that at the lower end.

The number and size of holes 82 in plate 80 appropriate to obtain the industry standard air velocity across the throat section 75 of the primary scrubber section 45 for effective water wash scrubbing of paint overspray ranging from 1500 to 1750 linear feet per minute can be determined empirically. The goal is to obtain a more turbulent water/air flow across the throat 75 of the primary scrubbing section 45.

One working embodiment of the spray booth at Graham Packaging Company is an enclosure which is 16 ft. long, 7 ft. deep, and 8 ft. high. The collection trough is rectangular in cross section. The plate is ⅛ in. thick and the collection tubes are schedule 40 stainless steel. The number and size of the holes defined in the venturi scrubber plate according to the present invention were calculated to provide an air flow velocity of about 1000 to 2000, preferably 1500 to 2000, more preferably 1500 to 1750, linear feet per minute. Since the venturi scrubber plate or plenum of this working embodiment is 16 ft. long, from 23 to 24 of the 6 in. holes were empirically determined appropriate to provide an air flow velocity of from about 1500 to about 2000 linear feet per minute. This provides a greatly increased surface area which is equivalent to doubling the perimeter of the throat. Mixing takes place most effectively at the lip so that a mist is formed akin to atomization of the fluid droplets.

The water of this working embodiment cascades down a curvilinear flood sheet, which has a 3 ft. radius to horizontal and which is positioned across from the spray heads, into a trough which is 16 ft. long, 1 ft. deep, and 18 in. wide. Paint laden air is pulled counter currently through the water curtain from 3 o'clock to 9 o'clock, i.e., at a sharp 90° turn, by the urging of an exhaust fan. The object is to provide a tortuous path so that good mixing results.

The water may contain additives, such as surfactants, anti-foaming agents, and detacifiers. When waste paint is being scrubbed, inclusion of a detacifier, e.g., DETAC™, is advantageous. The detacifier may be a chemical substance, such as a formaldehyde amine, which binds with reactive end group of the polymeric constituents of the paint.

The paint includes a solute which typically has a flash point of about 40 to 45° F. (about +8° C.). The sprayed paint typically produces droplets having a diameter ranging from 6 to 20 μm so that it is imperative that the droplets of paint enter the air-water interface quickly to prevent formation of dried paint particles prior to contact of the waste paint with the detacification chemicals contained in the water of the water curtain. Dried paint particles either do not react or react only poorly with the detacification chemicals.

The venturi scrubber plate of this working embodiment is additionally provided with collection tubes extending downwardly from each of the 6 in. holes. These collection tubes direct the flow of waste paint ladden air into the moving water stream at the bottom of the collection trough. These collection tubes function to increase the air velocity across the plate to a much greater extent than possible from the holes alone because of the venturi effect due to not only by the moving water stream but also to the exhaust fan positioned to exhaust air from the spray booth. This provides greater mixing and a significantly increased dissolution efficiency of the waste paint in the water. In a preferred embodiment, the collection tube lengths vary from relatively long at the front end, e.g., about 6.67 in., to shorter at the exit end, e.g., 3.56 in., in order to maintain an even distribution of air flow over the top of the pitched body of water flowing in the trough, i.e., the back of the booth is shallow.

At the heart of a scrubbing operation of this working embodiment is the provision of high energy impact, i.e., a high impact stand off distance. In the present invention, paint sprayed at a velocity of about 100 linear feet per minute is accelerated to about 1,800 linear feet per minute by the venturi scrubber plate so that the resulting momentum and inertia means that about three times more paint is removed from the paint ladden air. This is due to increased capture of the waste paint because the inertia of the accelerated paint droplets keeps them moving with the water flow down into the trough. Control of acceleration by the collection tubes can be fine tuned by varying the length of the collection tubes, such as by graduating their length from about 3.56 to about 6.67 in. over the 7 to 8 ft. length of the venturi scrubber plate.

The venturi scrubber plate is configured to effectively control air velocity and provide an air flow across the plate ranging from about 1000 to about 2000 linear feet per minute. This advantageously results in a high turbulence profile for the flow which improves paint capture by up to a factor of three times and improves detacification efficiency by inhibiting paint particle formation prior to contact with a detacification chemical contained in the water. Advantageously, collection of the waste paint at the front end of the system, i.e., upstream of the primary scrubber section, rather than at the back end as in prior art apparatus, means that chemicals have more time to react with the spent paint resulting in cleaner operation of the spray booth. In particular, there is less opportunity for the paint to dry into particles which have a greater resistance to the chemicals included to detacify the paint. This means that the maintenance requirements of the spray booth are significantly lowered. For example, the greater higher efficiency of waste paint removal means that the spray booth stays cleaner and that fewer filter changes of the filters provided ahead of the exhaust fan are required.

The venturi waste paint capture system is unique inasmuch as it employs a venturi trough. This system is designed to move 1500–1750 linear feet per minute velocity air in a high turbulence profile in order to greatly improve the paint capture of over-spray paint particles compared to a prior art capture system having a water flood sheet positioned opposite the spray heads and cascading into a simple trough. In such a prior art capture system, most of the collected particles were captured toward the end of the system and were too air dried to react well with detacifying chemicals contained in the water.

The new system collects most of the paint overspray droplets at the front of the system, and its high turbulent action detacifies the paint much more efficiently. The system employs collection tubes mounted below each of its 6 inch holes. These direct the flow into a moving water stream at the bottom of the trough. The tube lengths vary from relatively long at the front end to shorter at the exit end in order to maintain even distribution.

Advantages include higher efficiency paint capture, through enhanced kinematic impact of the paint particles, cleaner as well as easier to clean paint booth surfaces, greatly reduced filter changes and costs, reduced maintenance time and costs.

WORKING EXAMPLE

1. Venturi Scrubber Design Calculations:

The industry standard air velocity for effective water wash paint overspray scrubbing is 1500 linear feet per minute—

1750 linear feet per minute. This is a linear velocity measured across the throat of the primary scrubbing section. Water and paint-laden air will not effectively impact and mix below this stated velocity. The velocity must be high enough for the kinetic impact energy of the paint particles and wash water to overcome surface tension.

2. Booth Configuration:

The throat width is 16 feet. The throat height is 0.75 feet. The effective throat area is 12 square feet. The booth evacuation volume, is 7000 cubic feet per minute. Thus, the effective air flow velocity at the throat is 7500 cubic fee per minute ÷12 sq.ft.=625 linear feet per minute.

3. The Venturi Scrubber Plate:

The effective throat area is 3.98 square feet. The venturi area for a 5.63 inch diameter orifice is 0.173 square feet. When there are 23 venturis in the scrubbing plate the total venturi area is therefore 3.98 square feet. The booth evacuation volume is 7000 cubic feet per minute. The effective air flow velocity at the throat is 7000 cubic fee per minute ÷3.98 sq.ft.=1758 linear feet per minute.

4. Venturi Tapered Horizontal Pitch Spacing:

The length of each venturi. i.e., collection tube, is selected to maintain a uniform spacing between the bottom of the collection tube and the surface of the water in the wash water trough. The wash water trough is a channel through which the water leaves the spray booth and enters the post treatment tank. The water level in the trough pitches about 3 inches from one longitudinal end of the trough to the other. The venturis are maintained at a spacing of about 4 inches from the surface of the wash water, i.e., the length of the venturis are tapered. The purpose of keeping the spacing uniform is to balance airflow through each venturi. The constant spacing from the surface of the water ensures that airflow remains balanced across the entire length of the venturi plate.

A secondary effect of providing the tapered spacing is providing a secondary scrubbing action of the air stream. The air stream impacts upon the surface of the wash water.

Since the high velocity air and paint particle have significant momentum upon exiting the venturi nozzle and are traveling perpendicular to the surface of the wash water, paint particles tend to continue in the direction of travel through inertia. This creates additional impact of the paint particles and water.

The overall result was to enabling the system to run longer between maintenance periods.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A venturi scrubber plate for a waste capture system for a waste material entrained in a fluid flow, which waste capture system includes an enclosure having a flood sheet over which a liquid flows into a collection trough, an exhaust means which draws the fluid flow containing the waste material from the enclosure, across the collection trough, and through a throat section to a primary scrubber section, the venturi scrubber plate comprising:

a plate which is mounted on and substantially covers the collection trough, which has defined therein a plurality of holes, and through which the fluid flow containing the waste material flows, wherein the plate imposes a venturi effect on the fluid flow effective to accelerate the fluid flow so that turbulent mixing of the fluid flow containing the waste material and the liquid takes place and results in improved capture of waste material by the liquid ahead of the primary scrubber section.

2. The venturi scrubber plate according to claim 1, further comprising a plurality of collection tubes extending downwardly from respective ones of the plurality of holes toward the liquid flowing in the collection trough.

3. The venturi scrubber plate according to claim 2, wherein the plurality of collection tubes have respective heights which are graduated to maintain an approximately constant spacing between the liquid flowing in the collection trough and the collection tubes.

4. The venturi scrubber plate according to claim 2, wherein the plurality of holes in the plate are spaced apart in a staggered array.

5. The venturi scrubber plate according to claim 2, wherein the plurality of holes have a diameter and are present in a number effective to accelerate the fluid flow and provide a flow velocity ranging from about 1000 to about 2000 linear feet per minute across the throat section of the primary scrubber section.

6. The venturi scrubber plate according to claim 2, wherein the flow velocity ranges from about 1500 to about 2000 linear feet per minute.

7. The venturi scrubber plate according to claim 2, wherein the flow velocity ranges from about 1500 to about 1750 linear feet per minute.

8. The venturi scrubber plate according to claim 1, wherein the waste material is at least one material selected from the group consisting of a gas, a liquid, and a solid.

9. The venturi scrubber plate according to claim 8, wherein gas is at least one of $NO_x$ and $SO_x$, wherein the liquid is paint, and wherein the solid is one of flue dust, sugar, and salt.

10. The venturi scrubber plate according to claim 1, wherein the fluid is a gas selected from the group consisting of air and an inert gas.

11. The venturi scrubber plate according to claim 2, wherein the liquid is selected from the group consisting of water and an alcohol having from 1 to 8 carbon atoms.

12. A waste capture system for a waste material entrained in a fluid flow, comprising a venturi scrubber plate according to claim 1.

13. In a spraying apparatus comprised of an enclosure having a flood sheet over which a liquid flows into a collection trough, an exhaust means which draws a fluid flow containing waste material from the enclosure, across the collection trough, and through a throat section to a primary scrubber section, the improvement comprising:

a venturi scrubber plate according to claim 1 mounted on and substantially covering the collection trough.

14. A method for capture of waste material entrained in a fluid flow, comprising the steps of:

providing an enclosure having a flood sheet over which a liquid flows into a collection trough;

providing an exhaust means which draws the fluid flow containing the waste material through the enclosure, across the collection trough, and through a throat section to a primary scrubber section; and mounting a venturi scrubber plate according to claim 1 to substantially cover the collection trough, wherein the venturi scrubber plate imposes a venturi effect on the fluid flow effective to accelerate the fluid flow so that turbulent mixing of the fluid flow containing the waste material and the liquid takes place and results in improved capture of waste material by the liquid ahead of the primary scrubber section.

15. A venturi scrubber plate for a waste paint capture system for a waste paint entrained in an air flow as overspray from spray painting, which waste paint capture system includes an spray booth enclosure having a flood sheet over which water flows into a collection trough, an exhaust means which draws the air flow containing the waste paint from the spray booth enclosure, across the collection trough, and through a throat section to a primary scrubber section, the venturi scrubber plate comprising:

a plate which is mounted on and substantially covers the collection trough, which has defined therein a plurality of holes, and through which the air flow containing the waste paint flows, wherein the plate imposes a venturi effect on the air flow effective to accelerate the air flow so that turbulent mixing of the air flow containing the waste paint and the water takes place and results in improved capture of waste paint by the water ahead of the primary scrubber section.

16. The venturi scrubber plate according to claim 15, further comprising a plurality of collection tubes extending downwardly from respective ones of the plurality of holes toward the water flowing in the collection trough.

17. The venturi scrubber plate according to claim 16, wherein the plurality of collection tubes have respective heights which are graduated to maintain an approximately constant spacing between the water flowing in the collection trough and the collection tubes.

18. The venturi scrubber plate according to claim 16, wherein the plurality of holes in the plate are spaced apart in a staggered array.

19. The venturi scrubber plate according to claim 16, wherein the plurality of holes have a diameter and are present in a number effective to accelerate the air flow and provide a flow velocity ranging from about 1000 to about 2000 linear feet per minute across the throat section of the primary scrubber section.

20. The venturi scrubber plate according to claim 16, wherein the flow velocity ranges from about 1500 to about 2000 linear feet per minute.

21. The venturi scrubber plate according to claim 16, wherein the flow velocity ranges from about 1500 to about 1750 linear feet per minute.

22. A waste paint capture system for waste paint entrained in an air flow, comprising a venturi scrubber plate according to claim 15.

23. In a spraying apparatus comprised of an spray booth enclosure having a flood sheet over which water flows into a collection trough, an exhaust means which draws an air flow containing waste paint from the enclosure, across the collection trough, and through a throat section to a primary scrubber section, the improvement comprising:

a venturi scrubber plate according to claim 15 mounted on and substantially covering the collection trough.

24. A method for capture of waste paint entrained in an air flow, comprising the steps of:

providing an enclosure having a flood sheet over which water flows into a collection trough;

providing an exhaust means which draws the air flow containing the waste material through the enclosure, across the collection trough, and through a throat section to a primary scrubber section; and mounting a venturi scrubber plate according to claim 15 to substantially cover the collection trough, wherein the venturi scrubber plate imposes a venturi effect on the air flow effective to accelerate the air flow so that turbulent mixing of the air flow containing the waste paint and the water takes place and results in improved capture of waste paint by the water ahead of the primary scrubber section.

25. The method according to claim 24, further comprising including at least one additive in the water selected from the group consisting of a surfactant, an anti-foaming agent, and a detacifier.

26. The method according to claim 24, further comprising including an additive in the water which is a detacifier effective to bind with reactive end groups of polymeric constituents of the paint.

* * * * *